US012677249B2

(12) United States Patent
Wang et al.

(10) Patent No.: US 12,677,249 B2
(45) Date of Patent: Jul. 7, 2026

(54) METHOD AND APPARATUS FOR NEGOTIATION COMMUNICATION, AND TERMINAL DEVICE

(71) Applicant: GUANGDONG OPPO MOBILE TELECOMMUNICATIONS CORP., LTD., Dongguan (CN)

(72) Inventors: Shukun Wang, Dongguan (CN); Yang Xu, Dongguan (CN); Zhe Fu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 453 days.

(21) Appl. No.: 18/146,066

(22) Filed: Dec. 23, 2022

(65) Prior Publication Data

US 2023/0224854 A1 Jul. 13, 2023

Related U.S. Application Data

(63) Continuation of application No. PCT/CN2020/118367, filed on Sep. 28, 2020.

(51) Int. Cl.
*H04W 68/00* (2009.01)
*H04W 8/24* (2009.01)
(Continued)

(52) U.S. Cl.
CPC ........... *H04W 68/005* (2013.01); *H04W 8/24* (2013.01); *H04W 36/305* (2018.08); *H04W 76/10* (2018.02)

(58) Field of Classification Search
None
See application file for complete search history.

(56) References Cited

U.S. PATENT DOCUMENTS

2013/0281094 A1 10/2013 Ryu et al.
2015/0063276 A1 3/2015 Ryu et al.
(Continued)

FOREIGN PATENT DOCUMENTS

CN 103428353 A 12/2013
CN 108933992 A 12/2018
(Continued)

OTHER PUBLICATIONS

First Office Action of the Chinese application No. 202080105063.7, issued on Jul. 19, 2024. 13 pages with English translation.
(Continued)

*Primary Examiner* — Gary Lafontant
(74) *Attorney, Agent, or Firm* — PERKINS COIE LLP

(57) ABSTRACT

A method for negotiating communication includes that: a terminal device receives a paging message transmitted by a first network or a terminal device triggers initiation of a radio resource control (RRC) connection establishment procedure to a first network, the first network being a network corresponding to a first communication card in the terminal device; and the terminal device transmits first indication information to a second network, the first indication information indicating that the terminal device requests to leave the second network to communicate with the first network, and the second network being a network corresponding to a second communication card in the terminal device. A terminal device, a chip and a non-transitory computer-readable storage medium are further provided.

18 Claims, 7 Drawing Sheets

100

(51) Int. Cl.
  *H04W 36/30*     (2009.01)
  *H04W 76/10*     (2018.01)

(56)           References Cited

U.S. PATENT DOCUMENTS

| | | | |
|---|---|---|---|
| 2015/0181614 A1 | 6/2015 | Mitra | |
| 2018/0167984 A1 | 6/2018 | Krishnamoorthy | |
| 2019/0037386 A1 | 1/2019 | Dawid | |
| 2021/0014934 A1* | 1/2021 | Lovlekar | H04W 4/60 |
| 2021/0410107 A1 | 12/2021 | Park et al. | |

FOREIGN PATENT DOCUMENTS

| | | | |
|---|---|---|---|
| CN | 110300434 A | * | 10/2019 |
| CN | 110741681 A | | 1/2020 |
| WO | 2017052906 A1 | | 3/2017 |
| WO | 2018084761 A1 | | 5/2018 |
| WO | 2019007054 A1 | | 1/2019 |
| WO | 2020186092 A2 | | 9/2020 |

OTHER PUBLICATIONS

CMCC. "Discussion on the paging collision and interruption issues for multi-sim UEs", 3GPP TSG-RAN WG2 Meeting #111 electronic R2-2007418, Aug. 28, 2020 (Aug. 28, 2020). 2 pages.

International Search Report in the international application No. PCT/CN2020/118367, mailed on Jun. 24, 2021. 5 pages with English translation.

Written Opinion of the International Search Authority in the international application No. PCT/CN2020/118367, mailed on Jun. 24, 2021. 6 pages with English translation.

3GPP TR 23.761 V0.4.0 (Jun. 2020), 3rd Generation Partnership Project; Technical Specification Group Services and System Aspects; Study on system enablers for devices having multiple Universal Subscriber Identity Modules (USIM) (Release 17)(clean). 79 pages.

3GPP TR 23.761 V0.4.0 (Jun. 2020), 3rd Generation Partnership Project; Technical Specification Group Services and System Aspects; Study on system enablers for devices having multiple Universal Subscriber Identity Modules (USIM) (Release 17)(maked up). 78 pages.

Supplementary European Search Report in the European application No. 20954727.2, mailed on Oct. 18, 2023. 11 pages.

* cited by examiner

100

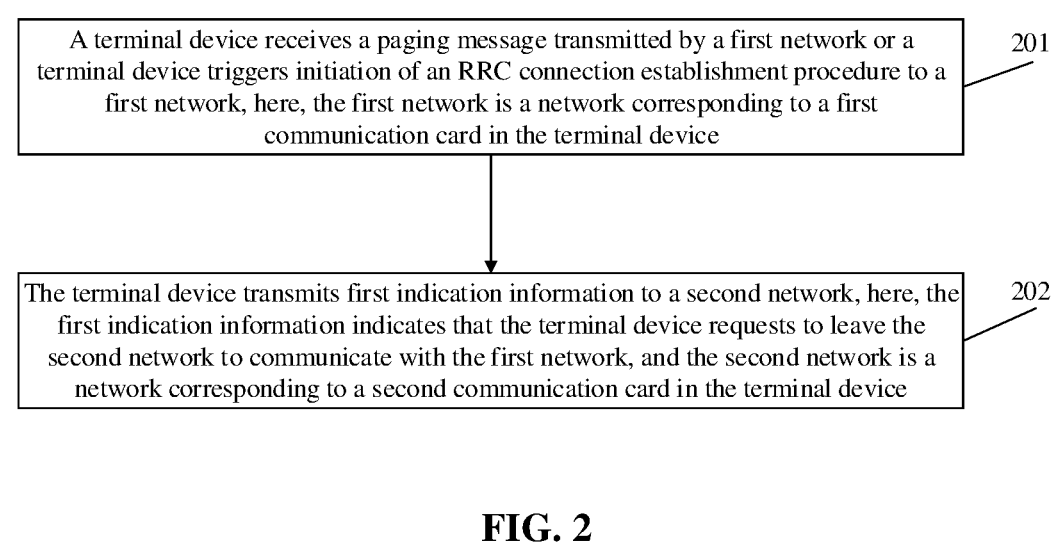

A terminal device receives a paging message transmitted by a first network or a terminal device triggers initiation of an RRC connection establishment procedure to a first network, here, the first network is a network corresponding to a first communication card in the terminal device — 201

The terminal device transmits first indication information to a second network, here, the first indication information indicates that the terminal device requests to leave the second network to communicate with the first network, and the second network is a network corresponding to a second communication card in the terminal device — 202

FIG. 2

METHOD AND APPARATUS FOR NEGOTIATION COMMUNICATION, AND TERMINAL DEVICE

CROSS-REFERENCE TO RELATED APPLICATION(S)

This application is a continuation of International Patent Application No. PCT/CN2020/118367 filed on Sep. 28, 2020, the entire contents of which are incorporated by reference herein in its entirety.

BACKGROUND

A dual-card mobile phone is a mobile phone capable of holding two communication cards at the same time. At present, there will be a problem that services of the two communication cards conflict if one communication card in the dual-card mobile phone is in the service and the other communication card in the dual-card mobile phone also needs to perform a service (e.g., the other communication card receives paging and needs to receive a service, or the other communication card initiates a service). How to deal with the service of the other communication card is a problem that needs to be solved.

SUMMARY

Embodiments of the present disclosure relate to the field of mobile communication technologies, and provide a method for negotiation communication, a terminal device, a chip and a non-transitory computer-readable storage medium.

In a first aspect, an embodiment of the present disclosure provides a method for negotiation communication, which includes the following operations.

A terminal device receives a paging message transmitted by a first network, or a terminal device triggers initiation of a Radio Resource Control (RRC) connection establishment procedure to a first network. The first network is a network corresponding to a first communication card in the terminal device.

The terminal device transmits first indication information to a second network. The first indication information indicates that the terminal device requests to leave the second network to communicate with the first network. The second network is a network corresponding to a second communication card in the terminal device.

In a second aspect, an embodiment of the present disclosure provides a terminal device, which includes a transceiver, a processor and a memory. The memory is configured to store computer programs that, when executed by the processor, cause the processor to: receive, through the transceiver, a paging message transmitted by a first network, or trigger initiation of a Radio Resource Control (RRC) connection establishment procedure to a first network, wherein the first network is a network corresponding to a first communication card in the terminal device; and transmit, through the transceiver, first indication information to a second network, wherein the first indication information indicates that the terminal device requests to leave the second network to communicate with the first network, and the second network is a network corresponding to a second communication card in the terminal device.

In a third aspect, an embodiment of the present disclosure provides a chip configured to implement the method for the negotiation communication in the first aspect.

Specifically, the chip includes a processor for invoking and running computer programs from a memory to cause a device equipped with the chip to perform the method for the negotiation communication in the first aspect.

In a fourth aspect, an embodiment of the present disclosure provides a non-transitory computer-readable storage medium configured to store computer programs that, when executed by a computer, cause the computer to perform the method for the negotiation communication in the first aspect.

BRIEF DESCRIPTION OF THE DRAWINGS

The drawings illustrated herein serve to provide a further understanding of the present disclosure and constitute a part of the present disclosure. The illustrative embodiments of the present disclosure and the description thereof are used to explain the present disclosure and do not constitute an undue limitation of the present disclosure. In the drawings:

FIG. 2 is a flowchart of a method for negotiation communication provided by an embodiment of the present disclosure.

DETAILED DESCRIPTION

The technical solutions in the embodiments of the present disclosure will be described below with reference to the drawings in the embodiments of the present disclosure. It is apparent that the described embodiments are a part of the embodiments of the present disclosure, but not all of the embodiments. Based on the embodiments of the disclosure, all other embodiments obtained by those of ordinary skilled in the art without creative work shall fall within the scope of protection of the present disclosure.

The technical solutions of the embodiments of the present disclosure can be applied to various communication systems, such as a Long Term Evolution (LTE) system, an LTE Frequency Division Duplex (FDD) system, an LTE Time Division Duplex (TDD) system, a 5G communication system or a future communication system, or the like.

Figure 1:
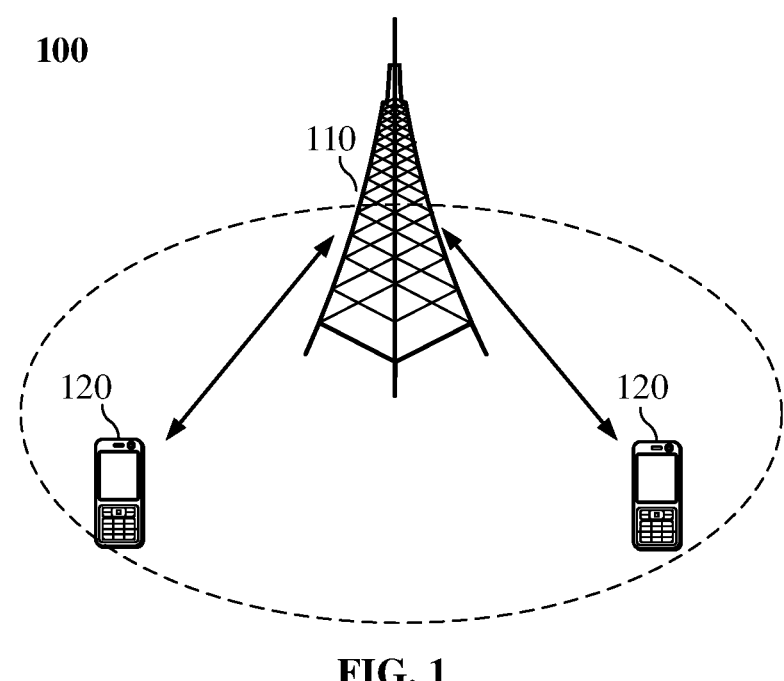
FIG. 1 is a diagram of architecture of a communication system provided by an embodiment of the present disclosure.

Exemplarily, a communication system 100 to which the embodiments of the present disclosure are applied is illustrated in FIG. 1. The communication system 100 may include a network device 110. Herein, the network device 110 may be a device that communicates with a terminal 120 (or called a communication terminal or terminal). The network device 110 may provide communication coverage for a specific geographic area, and may communicate with terminals located within the coverage area. In an embodiment, the network device 110 may be an Evolutional Node B (eNB or eNodeB) in an LTE system, or a wireless controller in a Cloud Radio Access Network (CRAN); or the network device may be a mobile switching center, a relay station, an access point, an in-vehicle device, a wearable device, a hub, a switch, a bridge, a router, a network device in a 5G network or a network device in a future communication system, or the like.

The communication system 100 further includes at least one terminal 120 located within the coverage of the network device 110. The "terminal" used herein includes, but is not limited to, a device that is configured to receive/transmit communication signals via a wired connection (such as a Public Switched Telephone Network (PSTN), a Digital Subscriber Line (DSL), a digital cable, a direct cable connection), and/or via another data connection/network, and/or via a wireless interface with (such as a cellular network, a wireless Local Area Network (WLAN), a digital TV network such as a Digital Video Broadcasting Handheld (DVB-H) network, a satellite network, an Amplitude Modulation (AM)-Frequency Modulation (FM) broadcast transmitter), and/or via another terminal; and/or an Internet of Things (IoT) device. A terminal configured to communicate over a wireless interface may be referred to as a "wireless communication terminal", a "wireless terminal" or a "mobile terminal". Examples of the mobile terminal may include, but are not limited to, a satellite or cellular phone; a Personal Communications System (PCS) terminal that may combine a cellular radio telephone with data processing, facsimile, and data communication capabilities; a Personal Digital Assistant (PDA) that may include a radiotelephone, a pager, an Internet/intranet access, a Web browser, a notebook, a calendar and/or a Global Positioning System (GPS) receiver; and a conventional laptop and/or palmtop receiver, or other electronic devices including radiotelephone transceivers. The terminal may be an access terminal, User Equipment (UE), a user unit, a user station, a mobile station, a mobile platform, a remote station, a remote terminal, a mobile device, a user terminal, a terminal, a wireless communication device, a user proxy or a user device. The access terminal may be a cellular phone, a cordless telephone, a Session Initiation Protocol (SIP) phone, a Wireless Local Loop (WLL) station, a Personal Digital Assistant (PDA), a handheld device having a wireless communication function, a computing device or other processing devices connected to a wireless modem, a vehicle-amounted device, a wearable device, a terminal device in a 5G network, or a terminal device in a future evolved Public Land Mobile Network (PLMN) or the like.

In an embodiment, Device to Device (D2D) communication may be performed between the terminals 120.

In an embodiment, the 5G communication system or the 5G network may also be referred to as a New Radio (NR) system or an NR network.

FIG. 1 exemplarily illustrates one network device and two terminals. In an embodiment, the communication system 100 may include multiple network devices and other numbers of terminals may be within the coverage of each network device, which is not limited in the embodiments of the present disclosure.

In an embodiment, the communication system 100 may also include other network entities such as network controllers, mobility management entities and the like, which are not limited in the embodiments of the present disclosure.

It should be understood that in the embodiments of the present disclosure, device(s) with communication function(s) in the network/system may be referred to as communication device(s). Taking the communication system 100 illustrated in FIG. 1 as an example, the communication devices may include a network device 110 and a terminal 120 with communication functions. Herein, the network device 110 and the terminal 120 may be the specific devices as described above, which will not be repeated here. The communication devices may further include other devices in the communication system 100, such as other network entities like network controllers and mobility management entities, which are not limited in the embodiment of the present disclosure.

It should be understood that the terms "system" and "network" herein are often used interchangeably. The term "and/or" herein is only an association relationship describing associated objects, which means that there may be three relationships. For example, "A and/or B" may represent three situations: A exists alone, A and B exist at the same time and B exists alone. In addition, the character "/" herein generally indicates that the associated objects before and after the character "/" are in an "or" relationship.

In order to facilitate understanding of the technical solutions of the embodiments of the present disclosure, the technical solutions related to the embodiments of the present disclosure are described below.

With the pursuit of people for speed, latency, high-speed mobility and energy efficiency, as well as the diversity and complexity of services in future life, the 3rd Generation Partnership Project (3GPP) as the international standards organization has begun to research and develop 5G. The main application scenarios of 5G include: enhanced Mobile Broadband (eMBB), Ultra-Reliable Low-Latency Communications (URLLC) and massive Machine-Type Communications (mMTC).

On the one hand, the eMBB still aims at access of users to multimedia contents, services and data, and the demand of the eMBB is growing rapidly. On the other hand, the eMBB may be deployed in different scenarios, such as indoor, urban, rural, and/or the like, and capabilities and requirements of the eMBB are quite different, so the eMBB cannot be generalized and must be analyzed in detail in combination with specific deployment scenarios. Typical applications of the URLLC include: industrial automation, power automation, telemedicine operation (surgery), traffic safety and so on. The typical characteristics of the mMTC include: high connection density, small data volume, delay-insensitive services, and low cost and long service life of modules.

RRC State

In order to reduce air interface signaling, and quickly resume wireless connection and data services, 5G defines a new Radio Resource Control (RRC) state, that is, an RRC inactive (RRC_INACTIVE) state. This state is different from an RRC idle (RRC_IDLE) state and an RRC active (RRC_ACTIVE) state.

1) The RRC_IDLE state ('idle state' for short): Mobility is handled by a cell selection and reselection based on a terminal device. Paging is initiated by a Core Network (CN), and a paging area is configured by the CN. No context of the terminal device exists on a base station side, and no RRC connection exists.

2) The RRC_CONNECTED state ('connected state' for short): an RRC connection exists, and the context of the terminal device exists on the base station side and the terminal device side. The network side knows that a location of the terminal device is at a specific cell level. Mobility is controlled by the network side. Unicast data can be transmitted between the terminal device and the base station.

3) The RRC_INACTIVE state ('inactive state' for short): Mobility is handled by the cell selection and reselection based on the terminal device. A connection between an access network and the core network exists, and the context of the terminal device exists on a certain base station. Paging is triggered by a Radio Access Network (RAN), and a paging area based on the RAN is managed by the RAN. The network side knows that the location of the terminal device is at an RAN-based paging area level. The network side does not need to be notified when the terminal device moves within a Radio Access Network Notification Area (RNA) configured by the RAN, but the network side needs to be notified when the terminal device moves out of the RNA.

The abovementioned three RRC states can be transitioned to each other. Some the terminal device side's RRC parameters in the inactive state are configured through an RRC release message, and the main RRC parameters include: an Inactive Radio Network Temporary Identifier (I-RNTI), an RAN Notification Area (RNA), an RAN Paging cycle, a periodic RNA update timer and a Next hop Chaining Counter (NCC).

The I-RNTI is configured to identify a terminal device inactive context of the terminal device on the base station side, and the I-RNTI is unique in the base station.

The RNA is configured to control the cell selection and reselection of the terminal device in the inactive state, and the RNA is also a paging range area for the RAN initial paging.

The RAN Paging cycle, which is an RAN DRX cycle, is configured to calculate a paging occasion for the RAN initial paging.

The periodic RNA update timer is a periodic location update timer T380.

The NCC is configured to determine a secret key used in an RRC connection resume procedure.

When the terminal device moves within the RNA, the terminal device does not need to notify the network side, and the terminal device follows a mobility behavior in the RRC idle state, that is, a cell selection and reselection principle. When the terminal device moves out of the paging area configured by the RAN, the terminal device triggers an RRC connection resume procedure and reacquires the paging area configured by the RAN. When the network side needs to transmit data to the terminal device, that is, when downlink data arrives, the base station storing the context of the terminal device will trigger all cells in the RAN paging area to transmit paging messages to the terminal device, so that the terminal device in the inactive state can resume the RRC connection for receiving data. In addition, the terminal device in the inactive state is configured with the RAN paging area, and in the RAN paging area, in order to ensure the accessibility of the terminal device, the terminal device needs to perform a periodic location update based on a cycle configured by the network. Scenarios for triggering the terminal device to perform an RNA update (RNAU) include that an RNAU timer expires or the terminal device moves out of the RNA.

Dual-Card and Dual-Standby/Dual-Network and Dual-Standby

A dual-card and dual-standby mobile phone refers to a mobile phone capable of holding two communication cards at the same time, and both the two communication cards are in a standby state. The dual-card and dual-standby is generally of the same network type, such as Global System for Mobile Communication (GSM) network dual-card and dual-standby, Code Division Multiple Access (CDMA) network dual-card and dual-standby, and/or Personal Handy-phone System (PHS) network dual-card and dual-standby.

The dual-network and dual-standby means that a mobile phone can hold two communication cards from different networks at the same time, and both the communication cards are in a startup state at the same time, so that user can dial, answer and transmit and receive short messages at will without network switching.

At present, mobile phones generally do not support pure dual-transmit and dual-receive ('dual-active' for short). The dual-transmit and dual-receive means that a mobile phone can perform uplink transmitting and downlink receiving of data on two networks through two communication cards at the same time. Generally speaking, most mobile phones only support single-transmit and single-receive or support single-transmit and dual-receive, which means that mobile phones can only perform services on one communication card at a certain time. However, the realization of dual-active is a trend of mobile phone development in the future. In 5G, for two communication cards of the mobile phone that supports dual-card and dual-standby or supports dual-network and dual-standby, one communication card can camp on an LTE cell and the other communication card can camp on a NR cell; or, both the two communication cards camp on the NR cell. On the other hand, the two communication cards can be communication cards of the same operator or the two communication cards can be communication cards of different operators.

At present, there will be a problem that services of the two communication cards conflict if one communication card in a dual-card mobile phone is in the service and the other communication card in the dual-card mobile phone also needs to perform a service (e.g., the other communication card receives paging and needs to receive a service, or the other communication card initiates a service). How to deal with the service of the other communication card and how to coordinate the services of the two communication cards are problems to be solved. Therefore, the following technical solutions of the embodiments of the present disclosure are proposed.

It should be noted that the "terminal device" in the embodiments of the present disclosure can be a mobile phone, a tablet computer, a wearable device, or the like. The terminal device has at least two communication cards. For example, the terminal device has two communication cards or three communication cards, or the like. The following embodiments are described by taking two communication cards as an example. However, it should be understood that the embodiments of the present disclosure are not limited thereto, the technical solutions of two or more communication cards are also applicable to the technical solutions of the embodiments of the present disclosure.

It should be noted that in an aspect, the embodiments of the present disclosure do not limit types of the first communication card and the second communication card. For example, both the first communication card and the second communication card are Subscriber Identity Module (SIM) cards. For example, both the first communication card and the second communication card are Universal Subscriber Identity Module (USIM) cards. For example, the first communication card is an SIM card and the second communication card is a USIM card. For example, the first communication card is a USIM card and the second communication card is an SIM card.

In another aspect, the embodiments of the present disclosure do not limit network types supported by the first communication card and the second communication card.

For example, the first communication card supports an LTE network (i.e., the first base station corresponding to the first communication card is an LTE base station), and the second communication card supports an NR network (i.e., the second base station corresponding to the second communication card is an NR base station). For example, both the first communication card and the second communication card support the NR network (i.e., the first base station corresponding to the first communication card and the second base station corresponding to the second communication card are both NR base stations).

In still another aspect, the embodiments of the present disclosure do not limit the operator(s) to which the first communication card and the second communication card belong. For example, the first communication card and the second communication card may belong to the same operator or may belong to different operators.

FIG. 2 is a flowchart of a method for negotiation communication provided by the embodiment of the present disclosure. As illustrated in FIG. 2, the method for negotiation communication includes following operations 201 to 202.

At an operation 201, a terminal device receives a paging message transmitted by a first network or a terminal device triggers initiation of an RRC connection establishment procedure to a first network. The first network is a network corresponding to a first communication card in the terminal device.

In the embodiment of the present disclosure, the terminal device receives, through the first communication card in an idle state or an inactive state, the paging message transmitted by the first network; or the terminal device triggers, through the first communication card in an idle state or an inactive state, initiation of the RRC connection establishment procedure to the first network. Herein, the first network is the network corresponding to the first communication card in the terminal device.

In the embodiment of the present disclosure, the terminal device further receives service data transmitted by a second network. The second network is a network corresponding to a second communication card in the terminal device. Specifically, the terminal device receives, through the second communication card in a connected state, the service data transmitted by the second network.

For example, the terminal device has a USIM-A card (i.e., the second communication card) and a USIM-B card (i.e., the first communication card). The USIM-A card is in the connected state, and the USIM-B card is in the idle state or the inactive state. The terminal device receives the service data in a network (i.e., the second network) corresponding to the USIM-A card, and the terminal device receives the paging message in a network (i.e., the first network) corresponding to the USIM-B card or triggers initiation of the RRC connection establishment procedure to a network corresponding to the USIM-B card.

Figure 3:
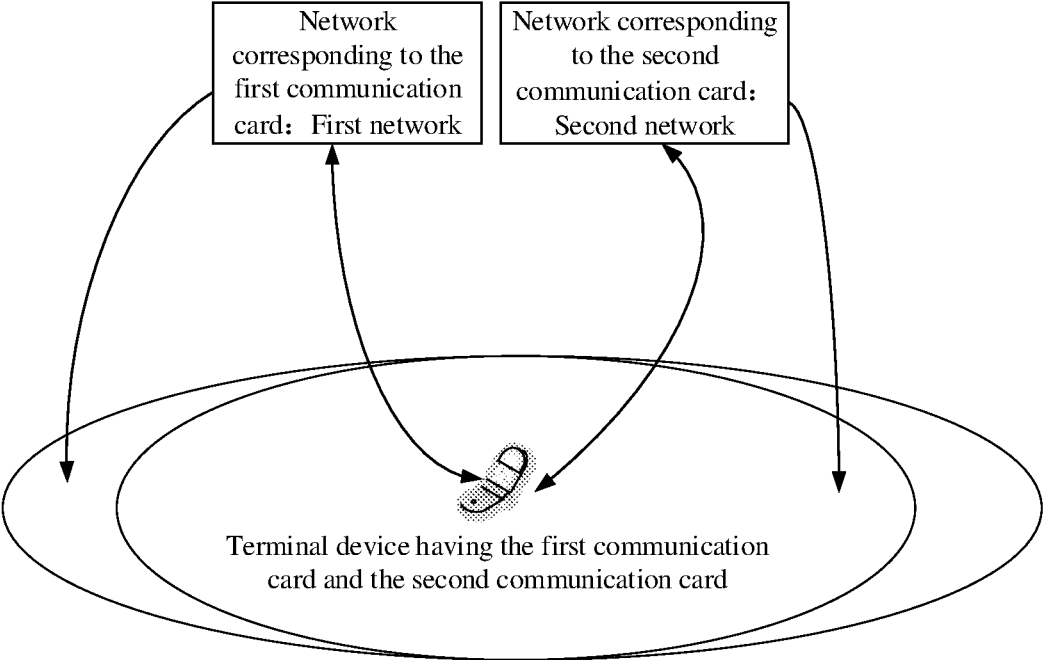
FIG. 3 is a diagram of a dual communication card provided by an embodiment of the present disclosure.

Referring to FIG. 3, the terminal device has the first communication card and the second communication card. The network corresponding to the first communication card is the first network, and the network corresponding to the second communication card is the second network. On the one hand, the terminal device can access the first network through the first communication card to perform service(s) on the first network. On the other hand, the terminal device can access the second network through the second communication card to perform service(s) on the second network. Types of the first network and the second network may be the same or different. For example, the first network is an LTE network and the second network is an NR network. For another example, both the first network and the second network are NR networks.

In the embodiment of the present disclosure, the first communication card of the terminal device is in the idle state or the inactive state, and the second communication card of the terminal device is in the connected state. For example, there are two USIM cards in the terminal device, i.e., the USIM-A card and the USIM-B card. The USIM-A card, which is performing service(s), is in the connected state; and the USIM-B card is in the idle state or the inactive state and receives the paging message.

It should be noted that the communication between the terminal device and the first network is performed through the first communication card, and the communication between the terminal device and the second network is performed through the second communication card. For example, there are two USIM cards in the terminal device, i.e., the USIM-A card and the USIM-B card. The terminal device can communicate with the second network through the USIM-A card, and the terminal device can communicate with the first network through the USIM-B card.

At an operation 202, the terminal device transmits first indication information to the second network. The first indication information indicates that the terminal device requests to leave the second network to communicate with the first network, and the second network is the network corresponding to the second communication card in the terminal device.

In the embodiment of the present disclosure, after the terminal device receives the paging message transmitted by the first network or triggers initiation of the RRC connection establishment procedure to the first network, the terminal device needs to establish an RRC connection with the first network (i.e., the first communication card needs to enter the connected state), and communicates with the first network based on the established RRC connection. The communication of the terminal device with the first network includes, but is not limited to, responding to the paging message transmitted by the first network. For example, the terminal device transmits a Non-Access Stratrum (NAS) signaling to the first network, herein, the NAS signaling is configured to notify the first network that the terminal device is performing service(s) on the second network and notify the first network not to page the terminal device any more. Since the terminal device can only communicate with one network at a time, the terminal device needs to notify the second network that the terminal device wants to leave the second network to communicate with the first network.

Specifically, the terminal device transmits the first indication information to the second network, herein, the first indication information indicates that the terminal device requests to leave the second network to communicate with the first network.

In an alternative embodiment, the first indication information indicates that the terminal device requests to leave the second network for a duration. For the duration of the terminal device leaving the second network, the second communication card is in the connected state and a service corresponding to the second communication card is in a suspended state.

Herein, for the duration of the terminal device leaving the second network, the second communication card is still in the connected state, but the service corresponding to the second communication card is in the suspended state at this time. That is, the second network temporarily does not transmit service data to the second communication card, but the second network still retains the RRC connection of the second communication card.

In the embodiment of the present disclosure, the terminal device leaves the first network after performing communication with the first network. Alternatively, the terminal device returns to the second network to continue communicating with the second network, for example, the terminal device continues receiving the service data from the second network. Herein, after the terminal device leaves the first network, the first communication card enters the idle state or the inactive state.

In an alternative embodiment, after the operation 202, the method further includes the following operations.

The terminal device starts a first timer after reception of first configuration information transmitted by the second network. The first configuration information is to determine inactive state configuration of the second communication card, and the duration of the first timer is T1.

In an alternative embodiment, the T1 is indicated by the first indication information. In another alternative embodiment, the T1 is configured by the second network. Specifically, the T1 is included in the first configuration information, or the T1 is configured to the terminal device along with the first configuration information.

A) If the first timer expires, the second communication card of the terminal device enters the inactive state from the connected state, and the terminal device starts a periodic location update timer based on the inactive state configuration of the second communication card.

B) If the terminal device leaves the first network and returns to the second network before the first timer expires, the terminal device stops the first timer and releases the inactive state configuration of the second communication card.

In an example, the inactive state configuration of the second communication card can be referred to as suspendconfig, and the suspendconfig indicates configuration information of the second communication card when entering the inactive state. Herein, the configuration information in the inactive state includes at least one of: an I-RNTI, an RNA, an RAN paging cycle, a periodic RNA update timer (i.e., periodic location update timer T380) or an NCC.

In the embodiment of the present disclosure, after the first configuration information is transmitted to the terminal device by the second network, the first timer is started by the second network, and the first timer is configured to trigger the second network to perform following operations.

If the first timer expires, the periodic location update timer is started.

If the terminal device leaves the first network and returns to the second network before the first timer expires, the first timer is stopped and the inactive state configuration of the second communication card is released.

In an example, when the second communication card of the terminal device is in the connected state but the service corresponding to the second communication card is in the suspended state (i.e., the terminal device leaves the second network), the terminal device receives the inactive state configuration (i.e., suspendconfig) transmitted by the second network and starts the first timer with the duration of the T1 (which can be indicated by the terminal device or configured by the second network). If the first timer expires, the second communication card of the terminal device enters the inactive state and the terminal device starts the periodic location update timer T380. Herein, a duration of T380 is configured in the suspendconfig. If the terminal device leaves the first network and returns to the second network before the first timer expires, the terminal device automatically releases the suspendconfig of the second communication card. For the second network, the second network, after transmitting the suspendconfig, starts the first timer. If the first timer expires, the second network starts the periodic location update timer T380. If the terminal device leaves the first network and returns to the second network before the first timer expires, the second network automatically releases the suspendconfig of the second communication card.

In an alternative embodiment, the terminal device measures a serving cell of the second network after the terminal device leaves the first network. In response to determining that a measurement result of the serving cell of the second network is less than or equal to a threshold or a Radio Link Failure (RLF) occurs in the serving cell of the second network, the terminal device initiates an RRC connection resume procedure or an RRC connection reestablishment procedure to the second network.

For example, the terminal device leaves the network (i.e., the first network) corresponding to the USIM-B card, before the terminal device returns to the network (i.e., the second network) corresponding to the USIM-A card, the terminal device is required to detect the measurement result of the serving cell corresponding to the USIM-A card, since a signal quality of the second network may change. If detecting that the measurement result of the serving cell is lower than the threshold or the RLF occurs in the serving cell, the terminal device initiates the RRC connection resume procedure to the second network to resume the RRC connection, or initiates the RRC connection reestablishment procedure to the second network to reestablish the RRC connection.

According to the technical solutions of the embodiments of the present disclosure, for a dual-card terminal device, mutual coordination of dual-card operations of the terminal device is guaranteed. In addition, after the terminal device leaves the second network, the second communication card is controlled to enter the inactive state based on the first timer, thereby reducing a delay of the terminal device for returning to the second network for resuming services.

Figure 4:
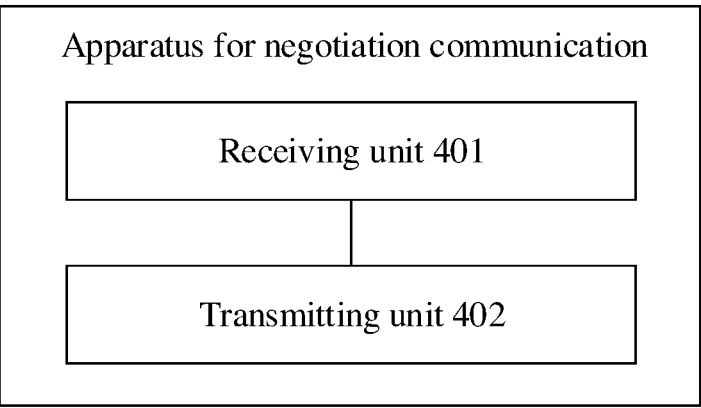
FIG. 4 is a diagram of a structure of an apparatus for negotiation communication provided by the embodiment of the present disclosure.

FIG. 4 is a diagram of a structure of an apparatus for negotiation communication provided by an embodiment of the present disclosure, which is for use in a terminal device. As illustrated in FIG. 4, the apparatus for negotiation communication includes a receiving unit 401 and a transmitting unit 402.

The receiving unit 401 is configured to receive a paging message transmitted by a first network, or trigger initiation of an RRC connection establishment procedure to a first network. The first network is a network corresponding to a first communication card in the terminal device.

The transmitting unit 402 is configured to transmit first indication information to a second network. The first indication information indicates that the terminal device requests to leave the second network to communicate with the first network, and the second network is a network corresponding to a second communication card in the terminal device.

In an alternative embodiment, the receiving unit 401 is configured to receive, through the first communication card in an idle state or an inactive state, the paging message transmitted by the first network.

In an alternative embodiment, the receiving unit 401 is further configured to receive service data transmitted by the second network, through the second communication card in a connected state.

In an alternative embodiment, the first indication information indicates that the terminal device requests to leave the second network for a duration.

In an alternative embodiment, for the duration of the terminal device leaving the second network, the second communication card is in the connected state and a service corresponding to the second communication card is in a suspended state.

In an alternative embodiment, the receiving unit 401 is further configured to receive first configuration information transmitted by the second network. The first configuration information is to determine inactive state configuration of the second communication card.

The apparatus further includes a processing unit (not shown in the figure). The processing unit is configured to: start a first timer, herein, the duration of the first timer is T1, and the T1 is indicated by the first indication information or the T1 is configured by the second network; if the first timer expires, enter, by the second communication card, the inactive state from the connected state, and start a periodic location update timer based on the inactive state configuration of the second communication card; if the terminal device leaves the first network and returns to the second network before the first timer expires, stop the first timer and release the inactive state configuration of the second communication card.

In an alternative embodiment, in a case that the T1 is configured by the second network, the T1 is contained in the first configuration information, or the T1 is configured to the terminal device along with the first configuration information.

In an alternative embodiment, after the first configuration information is transmitted to the terminal device by the second network, the first timer is started by the second network, and the first timer is configured to trigger the second network to perform the following operations including: if the first timer expires, starting the periodic location update timer; if the terminal device leaves the first network and returns to the second network before the first timer expires, stopping the first timer and releasing the inactive state configuration of the second communication card.

In an alternative embodiment, the apparatus further includes a measuring unit (not shown in the figure) and an establishment unit (not shown in the figure).

The measuring unit is configured to measure a serving cell of the second network after the terminal device leaves the first network.

The establishment unit is configured to: in response to determining that a measurement result of the serving cell of the second network is less than or equal to a threshold or an RLF occurs in the serving cell of the second network, initiate an RRC connection resume procedure or an RRC connection reestablishment procedure to the second network.

In an alternative embodiment, after the terminal device leaves the first network, the first communication card enters the idle state or the inactive state.

Those skilled in the art will appreciate that the description of the apparatus for negotiation communication of the embodiments of the present disclosure may be understood with reference to the description of the method for negotiation communication of the embodiments of the present disclosure.

Figure 5:
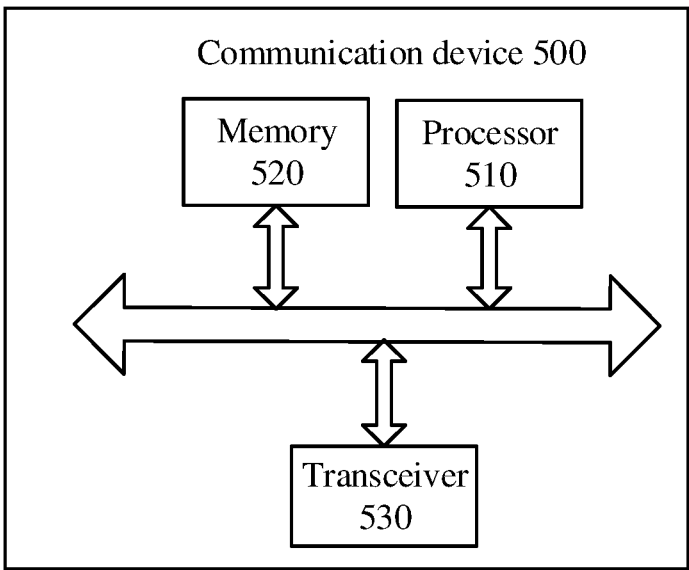
FIG. 5 is a structural diagram of a communication device provided by an embodiment of the present disclosure.

FIG. 5 is a structural diagram of a communication device 500 according to an embodiment of the present disclosure. The communication device may be a terminal device or a network device. The communication device 500 illustrated in FIG. 5 includes a processor 510 configured to invoke and run computer programs from a memory to perform the methods in the embodiments of the present disclosure.

In an embodiment, as illustrated in FIG. 5, the communication device 500 may further include a memory 520. The processor 510 is configured to invoke and run computer programs from the memory 520 to perform the methods in the embodiments of the present disclosure.

The memory 520 may be a separate device independent of the processor 510 or may be integrated within the processor 510.

In an embodiment, as illustrated in FIG. 5, the communication device 500 may further include a transceiver 530. The processor 510 is configured to control the transceiver 530 to communicate with other devices, specifically, transmitting information or data to other devices or receiving information or data transmitted by other devices.

The transceiver 530 may include a transmitter and a receiver. The transceiver 530 may further include antenna (s), the number of antennas may be one or more.

In an embodiment, the communication device 500 may be the network device of the embodiments of the present disclosure, and the communication device 500 is configured to perform the corresponding flows implemented by the network device in each method of the embodiments of the present disclosure. For brevity, details are not described herein.

In an embodiment, the communication device 500 may be the mobile terminal/terminal device of the embodiments of the present disclosure, and the communication device 500 is configured to perform the corresponding flows implemented by the mobile terminal/terminal device in each method of the embodiments of the present disclosure. For brevity, details are not described herein.

Figure 6:
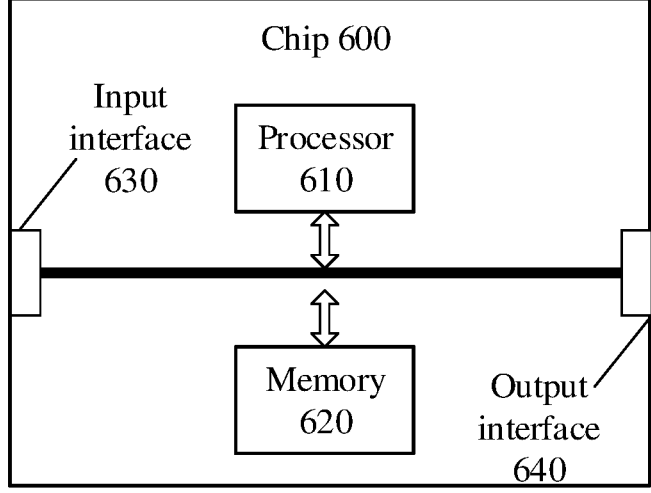
FIG. 6 is a structural diagram of a chip according to an embodiment of the present disclosure.

FIG. 6 is a structural diagram of a chip according to an embodiment of the present disclosure. The chip 600 illustrated in FIG. 6 includes a processor 610 configured to invoke and run computer programs from a memory to perform the methods in the embodiments of the present disclosure.

In an embodiment, as illustrated in FIG. 6, the chip 600 may further include a memory 620. The processor 610 is configured to invoke and run computer programs from the memory 620 to perform the methods in the embodiments of the present disclosure.

The memory 620 may be a separate device independent of the processor 610 or may be integrated within the processor 610.

In an embodiment, the chip 600 may further include an input interface 630. The processor 610 is configured to control the input interface 630 to communicate with other devices or chips, specifically, acquiring information or data transmitted by the other devices or chips.

In an embodiment, the chip 600 may further include an output interface 640. The processor 610 is configured to control the output interface 640 to communicate with other devices or chips, specifically, outputting information or data to other devices or chips.

In an embodiment, the chip may be applied to the network device in the embodiments of the present disclosure, and the chip is configured to perform the corresponding flows implemented by the network device in each method of the embodiments of the present disclosure. For brevity, details are not described herein.

In an embodiment, the chip may be applied to the mobile terminal/terminal device in the embodiments of the present disclosure, and the chip is configured to perform the corresponding flows implemented by the mobile terminal/terminal device in each method of the embodiments of the present disclosure. For brevity, details are not described herein.

It should be understood that the chip mentioned in the embodiments of the present disclosure may also be referred to as a system-level chip, a system chip, a chip system or a system-on-chip or the like.

Figure 7:
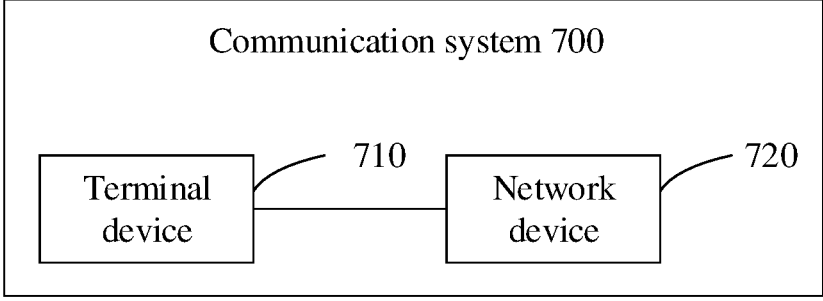
FIG. 7 is a block diagram of a communication system provided by an embodiment of the present disclosure.

FIG. 7 is a block diagram of a communication system 700 according to an embodiment of the present disclosure. As illustrated in FIG. 7, the communication system 700 includes a terminal device 710 and a network device 720.

The terminal device 710 may be configured to implement corresponding functions implemented by the terminal device in the methods described above, and the network device 720 may be configured to implement corresponding functions implemented by the network device in the methods described above. For brevity, details are not described herein.

It should be understood that the processor of the embodiments of the present disclosure may be an integrated circuit chip having signal processing capability. In the implementation process, the operations of the method embodiments may be accomplished by integrated logic circuits of hardware in the processor or instructions in the form of software. The processor may be a general purpose processor, a Digital Signal Processor (DSP), an Application Specific Integrated Circuit (ASIC), a Field Programmable Gate Array (FPGA) or other programmable logic device, a discrete gate or transistor logic device, or a discrete hardware component. The methods, operations, and logical block diagrams disclosed in the embodiments of the present disclosure may be implemented or executed. The general purpose processor may be a microprocessor or the processor may be any conventional processor or the like. The operations of the methods disclosed in connection with the embodiments of the present disclosure may be directly embodied as being executed and completed by a hardware decoding processor, or executed and completed by a combination of hardware and software modules in the decoding processor. The software module may be located in a mature storage medium in the field, such as a random access memory, a flash memory, a read-only memory, a programmable read-only memory, an electrically erasable programmable memory, or a register, or the like. The storage medium is located in the memory, and the processor is configured to read the information in the memory and perform the operations of the methods in combination with the hardware.

It will be understood that the memory in the embodiments of the present disclosure may be a transitory memory or a non-transitory memory, or may include both transitory and non-transitory memory. Herein, the non-transitory memory may be a Read Only Memory (ROM), a Programmable ROM (PROM), an Erasable PROM (EPROM), an Electrically EPROM (EEPROM) or a flash memory. The transitory memory may be a Random Access Memory (RAM) that functions as an external cache. By way of exemplary but not restrictive description, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ES-DRAM), a Synchlink DRAM, (SLDRAM), and a Direct Rambus RAM (DR RAM). It should be noted that the memories in the systems and methods described herein are intended to include, but are not limited to, these and any other suitable types of memories.

It should be understood that the memory described above is exemplary but not restrictive. For example, the memory in the embodiments of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), a Direct Rambus RAM (DR RAM), or the like. That is, the memories in the embodiments of the present disclosure are intended to include, but is not limited to, these and any other suitable types of memories.

Embodiments of the present disclosure further provide a computer-readable storage medium for storing computer programs.

In an embodiment, the computer-readable storage medium may be applied to the network device in the embodiments of the present disclosure, and the computer programs cause the computer to perform the corresponding flows implemented by the network device in the methods in the embodiments of the present disclosure. For brevity, details are not described herein.

In an embodiment, the computer-readable storage medium may be applied to the mobile terminal/terminal device in the embodiments of the present disclosure, and the computer programs cause the computer to perform the corresponding flows implemented by the mobile terminal/terminal device in the methods of the embodiments of the present disclosure. For brevity, details are not described herein.

Embodiments of the present disclosure further provide a computer program product including computer program instructions.

In an embodiment, the computer program product may be applied to the network device in the embodiments of the present disclosure, and the computer program instruction causes the computer to perform the corresponding flows implemented by the network device in the methods of the embodiments of the present disclosure. For brevity, details are not described herein.

In an embodiment, the computer program product may be applied to the mobile terminal/terminal device in the embodiments of the present disclosure, and the computer program instruction causes the computer to perform the corresponding flows implemented by the mobile terminal/terminal device in the methods of the embodiments of the present disclosure. For brevity, details are not described herein.

Embodiments of the present disclosure further provide a computer program.

In an embodiment, the computer program may be applied to the network device in the embodiments of the present disclosure. When the computer program is run on a computer, the computer is caused to perform the corresponding flows implemented by the network device in the methods of the embodiment of the present disclosure. For brevity, details are not described herein.

In an embodiment, the computer program may be applied to the mobile terminal/terminal device in the embodiments of the present disclosure. When the computer program is run on a computer, the computer is caused to perform the corresponding flows implemented by the mobile terminal/terminal device in the methods of the embodiments of the present disclosure. For brevity, details are not described herein.

Those of ordinary skill in the art will appreciate that the units and algorithm operations of the examples described in connection with the embodiments disclosed herein can be implemented in electronic hardware, or a combination of computer software and electronic hardware. Whether these functions are performed in hardware or software depends on the specific application and design constraints of the technical solutions. A person skilled in the art may implement the described functions using different methods for each particular application, but such an implementation should not be considered beyond the scope of the present disclosure.

Those skilled in the art will clearly understand that for the convenience and brevity of the description, for the specific working processes of the system, apparatus and unit described above, reference may be made to the corresponding processes in the foregoing method embodiments, and details are not described herein again.

In the several embodiments provided herein, it should be understood that the disclosed systems, apparatus, and methods may be implemented in other manners. For example, the apparatus embodiments described above are merely illustrative. For example, the division of the units is merely a logical function division, and may be implemented in other ways. For example, a plurality of units or components may be combined or integrated into another system, or some features may be ignored or not performed. In an embodiment, the displayed or discussed coupling or direct coupling or communication connection may be indirect coupling or communication connection, via some interface, devices or units, and may be in electrical, mechanical or other forms.

The units described as separate parts may or may not be physically separate, and the parts displayed as units may or may not be physical units, i.e. may be located in one place, or may be distributed over multiple network units. Some or all of the units may be selected according to actual needs to achieve the objectives of the solutions of the embodiments.

In addition, each functional unit in various embodiments of the present disclosure may be integrated into one processing unit, or each unit may exist separately and physically, or two or more units may be integrated into one unit.

The functions may be stored in a computer-readable storage medium if they are implemented as software functional units and sold or used as stand-alone products. Based on such an understanding, the technical solutions of the present disclosure essentially or, a part of the technical solutions of the present disclosure that makes contribution to the related art, or a part of the technical solutions of the present disclosure may be embodied in the form of a software product which is stored in a storage medium and which includes several instructions for causing a computer device (which may be a personal computer, a server, a network device, or the like) to perform all or part of the operations of the methods described in the embodiments of the present disclosure. The foregoing storage medium includes a USB flash drive, a removable hard disk, a Read-Only Memory (ROM), a Random Access Memory (RAM), a magnetic disk, an optical disc, or any other medium that can store program codes.

The foregoing descriptions are merely specific embodiments of the present disclosure, but the protection scope of the present disclosure is not limited thereto. Any change or replacement readily conceived by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A method for negotiation communication, comprising:
receiving, by a terminal device, a paging message transmitted by a first network, or triggering, by a terminal device, initiation of a Radio Resource Control (RRC) connection establishment procedure to a first network, wherein the first network is a network corresponding to a first communication card in the terminal device; and
transmitting, by the terminal device, first indication information to a second network, wherein the first indication information indicates that the terminal device requests to leave the second network, the second network is a network corresponding to a second communication card in the terminal device, wherein during a T1 duration for which the terminal device leaves the second network, the second communication card is in a connected state, the T1 is configured by the second network.

2. The method of claim 1, wherein receiving, by the terminal device, the paging message transmitted by the first network comprises:
receiving, by the terminal device, the paging message transmitted by the first network, through the first communication card in an idle state or an inactive state.

3. The method of claim 1, further comprises: before transmitting, by the terminal device, the first indication information to the second network,
receiving, by the terminal device, service data transmitted by the second network, through the second communication card in a connected state.

4. The method of claim 1, wherein during the T1 duration, a service corresponding to the second communication card is in a suspended state.

5. The method of claim 1, further comprising:
after reception of first configuration information transmitted by the second network, starting, by the terminal device, a first timer with the T1 duration, wherein the first configuration information is to determine inactive state configuration of the second communication card;
when the first timer expires, entering, by the terminal device, an inactive state from a connected state at the second communication card, and starting, by the terminal device, a periodic location update timer based on the inactive state configuration of the second communication card;
when the terminal device leaves the first network and returns to the second network before the first timer expires, stopping, by the terminal device, the first timer and releasing, by the terminal device, the inactive state configuration of the second communication card.

6. The method of claim 5, wherein
the T1 is contained in the first configuration information; or
the T1 is configured to the terminal device along with the first configuration information.

7. The method of claim 5, wherein after the first configuration information is transmitted to the terminal device by the second network, the first timer is started by the second network, and the first timer is configured to trigger the second network to perform:
when the first timer expires, starting the periodic location update timer;
when the terminal device leaves the first network and returns to the second network before the first timer expires, stopping the first timer and releasing the inactive state configuration of the second communication card.

8. The method of claim 5, wherein the terminal device leaves the first network and returns to the second network, which comprises:
measuring, by the terminal device, a serving cell of the second network after the terminal device leaves the first network; and in response to determining that a measurement result of the serving cell of the second network is less than or equal to a threshold or a Radio Link Failure (RLF) occurs in the serving cell of the second network, initiating, by the terminal device, an RRC connection resume procedure or an RRC connection reestablishment procedure to the second network.

9. The method of claim 5, wherein the first communication card enters an idle state or an inactive state after the terminal device leaves the first network.

10. A terminal device, comprising:

a transceiver;

a processor; and a memory for storing computer programs that, when executed by the processor, cause the processor to:

receive, through the transceiver, a paging message transmitted by a first network, or trigger initiation of a Radio Resource Control (RRC) connection establishment procedure to a first network, wherein the first network is a network corresponding to a first communication card in the terminal device; and transmit, through the transceiver, first indication information to a second network, wherein the first indication information indicates that the terminal device requests to leave the second network, the second network is a network corresponding to a second communication card in the terminal device, wherein during a T1 duration for which the terminal device leaves the second network, the second communication card is in a connected state, the T1 is configured by the second network.

11. The terminal device of claim 10, wherein the transceiver is configured to receive, through the first communication card in an idle state or an inactive state, the paging message transmitted by the first network.

12. The terminal device of claim 10, wherein the transceiver is further configured to receive, through the second communication card in a connected state, service data transmitted by the second network.

13. The terminal device of claim 10, wherein during the T1 duration, a service corresponding to the second communication card is in a suspended state.

14. The terminal device of claim 10, wherein the transceiver is further configured to receive first configuration information transmitted by the second network, wherein the first configuration information is to determine inactive state configuration of the second communication card; and the processor is further configured to:

start a first timer with the T1 duration;

when the first timer expires, enter an inactive state from a connected state at the second communication card, and start a periodic location update timer based on the inactive state configuration of the second communication card;

when the terminal device leaves the first network and returns to the second network before the first timer expires, stop the first timer and release the inactive state configuration of the second communication card.

15. The terminal device of claim 14, wherein the T1 is contained in the first configuration information; or the T1 is configured to the terminal device along with the first configuration information.

16. The terminal device of claim 14, wherein after the first configuration information is transmitted to the terminal device by the second network, the first timer is started by the second network, and the first timer is configured to trigger the second network to perform:

when the first timer expires, starting the periodic location update timer;

when the terminal device leaves the first network and returns to the second network before the first timer expires, stopping the first timer and releasing the inactive state configuration of the second communication card.

17. The terminal device of claim 14, wherein the processor is further configured to:

measure a serving cell of the second network after the terminal device leaves the first network; and in response to determining that a measurement result of the serving cell of the second network is less than or equal to a threshold or a Radio Link Failure (RLF) occurs in the serving cell of the second network, initiate an RRC connection resume procedure or an RRC connection reestablishment procedure to the second network.

18. The terminal device of claim 14, wherein the first communication card enters an idle state or an inactive state after the terminal device leaves the first network.

* * * * *